United States Patent
Lecerf

(10) Patent No.: US 11,673,628 B2
(45) Date of Patent: Jun. 13, 2023

(54) MARINE SURVEY SOURCE ROUTE CONFIGURATION FOR MULTI-AZIMUTH ACQUISITION

(71) Applicant: PGS Geophysical AS, Oslo (NO)

(72) Inventor: Didier Lecerf, Weybridge (GB)

(73) Assignee: PGS Geophysical AS, Oslo (NO)

( * ) Notice: Subject to any disclaimer, the term of this patent is extended or adjusted under 35 U.S.C. 154(b) by 251 days.

(21) Appl. No.: 16/851,395

(22) Filed: Apr. 17, 2020

(65) Prior Publication Data

US 2020/0331566 A1    Oct. 22, 2020

Related U.S. Application Data

(60) Provisional application No. 62/835,060, filed on Apr. 17, 2019.

(51) Int. Cl.
*B63B 21/56* (2006.01)
*G05D 1/02* (2020.01)
*G01V 1/38* (2006.01)

(52) U.S. Cl.
CPC ............ *B63B 21/56* (2013.01); *G01V 1/3826* (2013.01); *G05D 1/0206* (2013.01)

(58) Field of Classification Search
CPC ........ B63B 21/56; G01V 1/38; G01V 1/3808; G01V 1/3817; G01V 1/3826; G01V 1/3843; G01V 1/3861; G05D 1/0206
See application file for complete search history.

(56) References Cited

U.S. PATENT DOCUMENTS

| | | | | |
|---|---|---|---|---|
| 3,806,863 | A | * | 4/1974 | Tilley .................. G01V 1/3808 367/21 |
| 6,028,817 | A | | 2/2000 | Ambs |
| 8,488,409 | B2 | | 7/2013 | Hill et al. |
| 8,547,784 | B2 | * | 10/2013 | MacNeill ............. G01V 1/3808 367/20 |
| 8,724,426 | B2 | | 5/2014 | Welker et al. |
| 8,780,669 | B2 | * | 7/2014 | Janiszewski ......... G01V 1/3808 367/20 |
| 9,013,952 | B2 | * | 4/2015 | Muyzert ............. G01V 1/3808 367/15 |
| 9,459,364 | B2 | | 10/2016 | Brizard |
| 9,494,429 | B2 | * | 11/2016 | Drange ................ G01C 21/165 |

(Continued)

FOREIGN PATENT DOCUMENTS

WO    2011057324    5/2011

OTHER PUBLICATIONS

Howard, "Marine Seismic Surveys with Enhanced Azimuth Coverage: Lessons in survey design and acquisition"; The Learning Edge (2 pgs) (Apr. 1, 2007) https://library.seg.org/doi/10.1190/1.2723212.

(Continued)

*Primary Examiner* — Ajay Vasudeva

(57) ABSTRACT

Marine survey source route configuration can include towing, via a first marine survey vessel, streamers at a first average speed and at an average velocity along a first survey route. A second marine survey vessel can tow a source at a second average speed that is greater than the first average speed along a second survey route that periodically passes over the first survey route and at the average velocity in a direction of the first survey route.

18 Claims, 15 Drawing Sheets
(4 of 15 Drawing Sheet(s) Filed in Color)

(56) References Cited

U.S. PATENT DOCUMENTS

| | | |
|---|---|---|
| 9,541,662 B2 | 1/2017 | Nielsen |
| 9,581,712 B2 * | 2/2017 | Brookes ............... G01V 1/3817 |
| 9,594,181 B2 * | 3/2017 | Solheim ............... G01V 1/3808 |
| 9,823,370 B2 | 11/2017 | Renaud |
| 9,945,973 B2 | 4/2018 | Grenie et al. |
| 10,254,423 B2 * | 4/2019 | Dudley ............... G05D 1/0206 |
| 10,281,602 B2 | 5/2019 | Moldoveanu et al. |
| 10,324,203 B2 | 6/2019 | Long |
| 2013/0188448 A1 | 7/2013 | Siliqi et al. |
| 2017/0176636 A1 | 6/2017 | Adams et al. |
| 2017/0285198 A1 | 10/2017 | Jupinet et al. |
| 2018/0001977 A1 | 1/2018 | Toennessen |
| 2020/0012004 A1 | 1/2020 | Elboth et al. |

OTHER PUBLICATIONS

Vinje, et al., "Shooting Over the Seismic Spread," First Break, vol. 35, pp. 97-104 (EAGE, Jun. 2017).

Haumonte, et al., "Survey Results Obtained in a Complex Geological Environment with Midwater Stationary Cable," SEG International Exposition and 87th Annual Meeting, pp. 196-200 (SEG, Sep. 2017).

Haumonte, et al., "A Paradigm Shift in Marine Seismic: Broadband Offset Full Azimuth 4C Acquisition with Midwater Stationary Cable," SET International Exposition and 87th Annual Meeting, pp. 5948-5952 (SEG, Sep. 2017).

Manin, et al., "Full-Azimuth, Full-Offset, High-Fidelity Vector Marine Seismic Acquisition," The Leading Edge, Apr. 2020, pp. 238-247 (SEG).

* cited by examiner

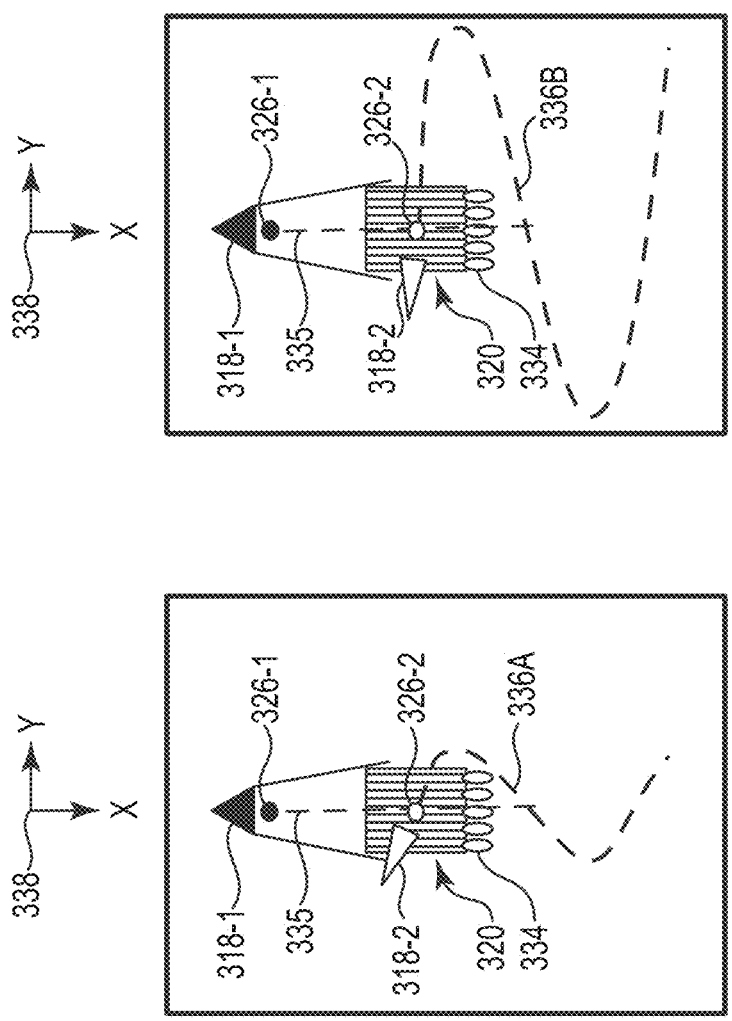

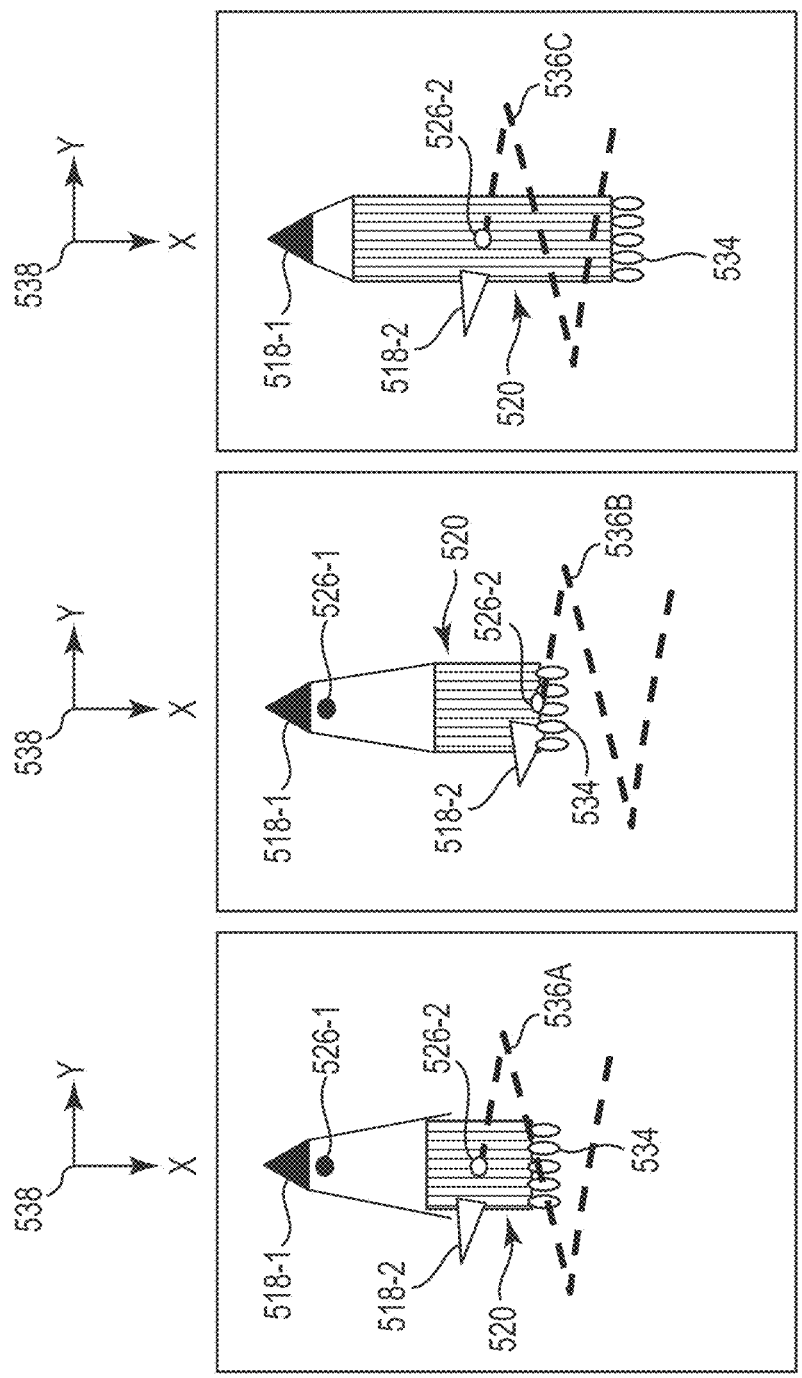

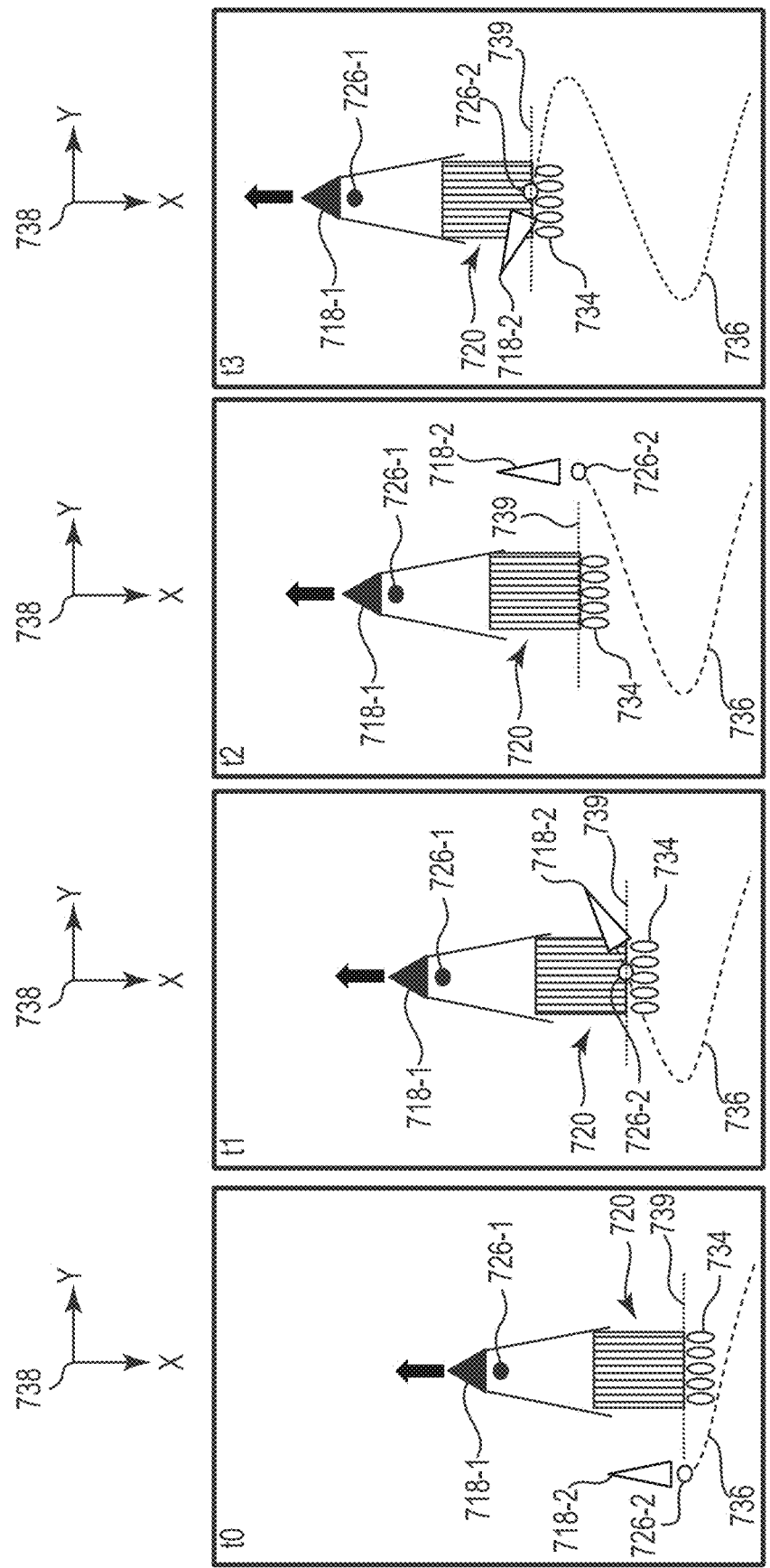

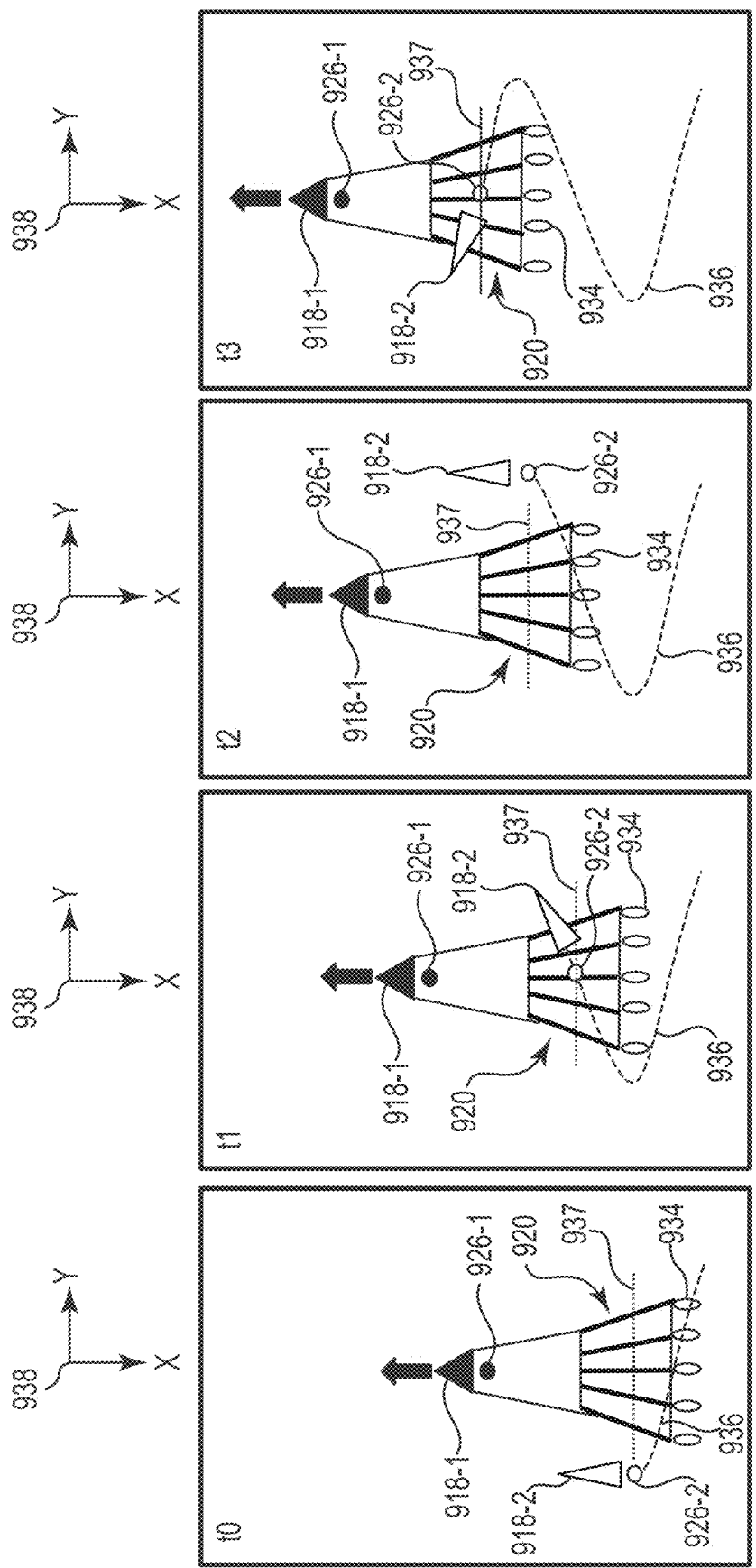

MARINE SURVEY SOURCE ROUTE CONFIGURATION FOR MULTI-AZIMUTH ACQUISITION

CROSS-REFERENCE TO RELATED APPLICATIONS

This application claims priority to U.S. Provisional Application 62/835,060, filed Apr. 17, 2019, which is incorporated by reference as if entirely set forth herein.

BACKGROUND

In the past few decades, the petroleum industry has invested heavily in the development of marine survey techniques that yield knowledge of subterranean formations beneath a body of water in order to find and extract valuable mineral resources, such as oil. High-resolution images of a subterranean formation are helpful for quantitative interpretation and improved reservoir monitoring. For a typical marine survey, a marine survey vessel tows one or more marine survey sources (hereinafter referred to as "sources") below the sea surface and over a subterranean formation to be surveyed. Marine survey receivers (hereinafter referred to as "receivers") may be located on or near the seafloor, on one or more streamers towed by the marine survey vessel, or on one or more streamers towed by another vessel. The marine survey vessel typically contains marine survey equipment, such as navigation control, source control, receiver control, and recording equipment. The source control may cause the one or more sources, which can be impulsive sources such as air guns, non-impulsive sources such as marine vibrator sources, electromagnetic sources, etc., to produce signals at selected times. Each signal is essentially a wave called a wavefield that travels down through the water and into the subterranean formation. At each interface between different types of rock, a portion of the wavefield may be refracted, and another portion may be reflected, which may include some scattering, back toward the body of water to propagate toward the sea surface. The receivers thereby measure a wavefield that was initiated by the actuation of the source.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3A is a plan or xy-plane view of an exemplary embodiment of a marine survey source route configuration for two sources with a low ratio of speed.

FIG. 3B is a plan or xy-plane view of an exemplary embodiment of a marine survey source route configuration for two sources with a high ratio of speed.

FIG. 5A is a plan or xy-plane view of an exemplary embodiment of a marine survey source route configuration for two sources with center crossing.

FIG. 5B is a plan or xy-plane view of an exemplary embodiment of a marine survey source route configuration for two sources with tail crossing.

FIG. 5C is a plan or xy-plane view of an exemplary embodiment of a marine survey source route configuration for one source with center crossing.

FIG. 7A is a plan or xy-plane view of an exemplary embodiment of a marine survey source route configuration for two sources with tail crossing at a first time.

FIG. 7B is a plan or xy-plane view of an exemplary embodiment of a marine survey source route configuration for two sources with tail crossing at a second time.

FIG. 7C is a plan or xy-plane view of an exemplary embodiment of a marine survey source route configuration for two sources with tail crossing at a third time.

FIG. 7D is a plan or xy-plane view of an exemplary embodiment of a marine survey source route configuration for two sources with tail crossing at a fourth time.

FIG. 9A is a plan or xy-plane view of an exemplary embodiment of a marine survey source route configuration for two sources and fanned streamers at a first time.

FIG. 9B is a plan or xy-plane view of an exemplary embodiment of a marine survey source route configuration for two sources and fanned streamers at a second time.

FIG. 9C is a plan or xy-plane view of an exemplary embodiment of a marine survey source route configuration for two sources and fanned streamers at a third time.

FIG. 9D is a plan or xy-plane view of an exemplary embodiment of a marine survey source route configuration for two sources and fanned streamers at a fourth time.

DETAILED DESCRIPTION

Figure 1:
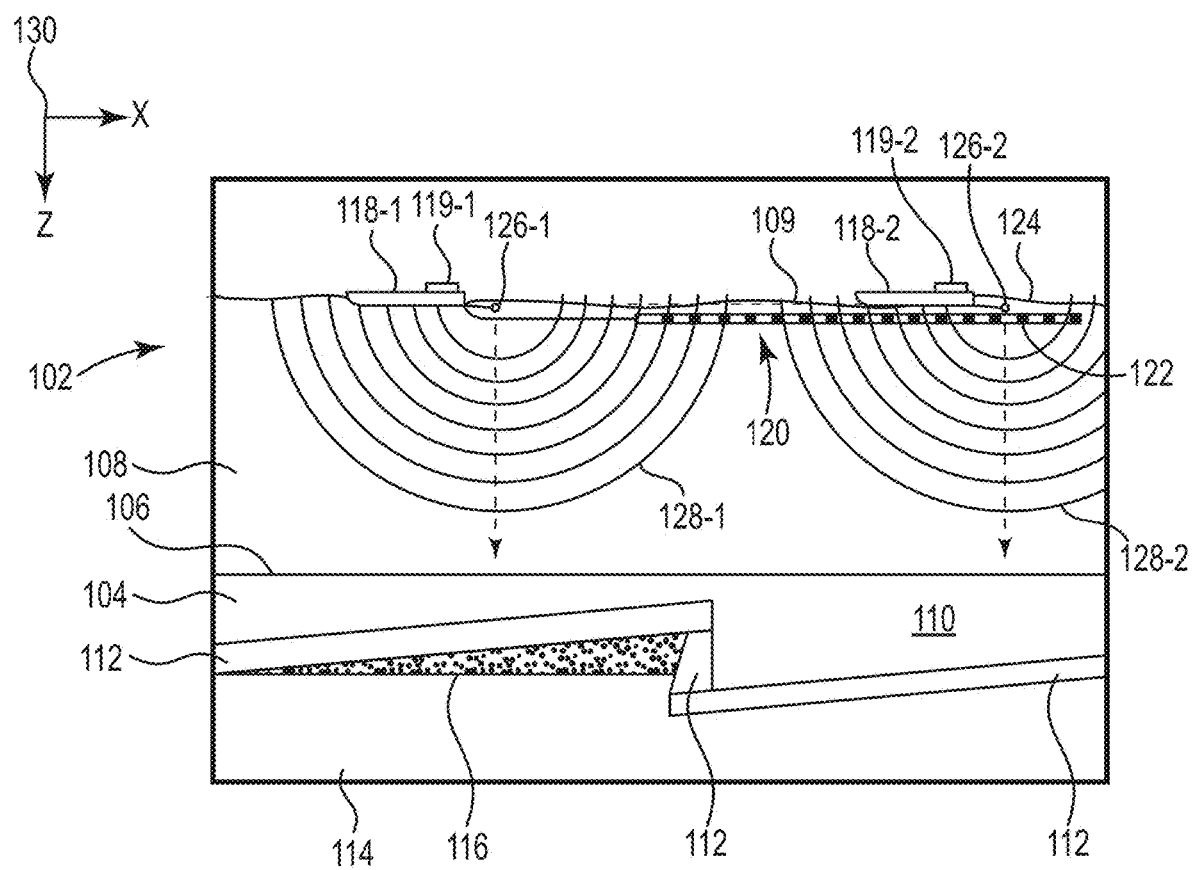
FIG. 1 is an elevation or xz-plane view of an example of marine surveying in which signals are emitted by sources for recording by receivers.

The present disclosure is related to marine survey source route configuration for multi-azimuth acquisition. The use of ocean-bottom nodes (OBN) can provide for high quality wide azimuth (WAZ) acquisition. However, OBN systems are difficult and expensive to deploy. It may be difficult to provide high quality WAZ data with towed streamer acquisition because the width of the streamer spread is limited and usually the marine survey vessel towing the streamer array is also towing the sources used for the survey. Embodiments of the present disclosure can include an acquisition design that provides high quality WAZ illumination in a cost-effective way. The level of dragging noise can be reduced due to the low velocity at which the streamers are towed. Because the source is decoupled from the recording system, the acquisition design can be adapted for recording long offsets for velocity model building by FWI. Embodiments of the present disclosure can be fully three-dimensional or four-dimensional (4D) broadband compliant and separated wavefield imaging with multiples (SWIM) compatible. 4D surveys are also referred to as time-lapse surveys for reservoir monitoring.

As used herein, "near-continuous" means without meaningful breaks. As would be understood by one of ordinary skill in the art with the benefit of this disclosure, operational circumstances can cause intermittent gaps in signal emission, and "near-continuous" should be read to include intermittent or periodic gaps, whether planned or unplanned, as well as signal emission without intermittent or periodic gaps, thus including continuous signal emission. For simplicity, the term "near-continuous" is used herein and does not exclude "continuous".

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected and, unless stated otherwise, can include a wireless connection.

The figures herein follow a numbering convention in which the first digit or digits correspond to the drawing figure number and the remaining digits identify an element or component in the drawing. Similar elements or components between different figures may be identified by the use of similar digits. For example, 120 may reference element "20" in FIG. 1, and a similar element may be referenced as 220 in FIG. 2. Analogous elements within a Figure may be referenced with a hyphen and extra numeral or letter. See, for example, elements 126-1, and 126-2 in FIG. 1. Such analogous elements may be generally referenced without the hyphen and extra numeral or letter. For example, elements 126-1 and 126-2 may be collectively referenced as 126. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

FIG. 1 is an elevation or xz-plane 130 view of marine surveying in which signals are emitted by a source 126 for recording by receivers 122. The recording can be used for processing and analysis in order to help characterize the structures and distributions of features and materials underlying the surface of the earth. For example, the recording can be used to estimate a physical property of a subsurface location, such as the presence of a reservoir that may contain hydrocarbons. FIG. 1 shows a domain volume 102 of the earth's surface comprising a subsurface volume 104 of sediment and rock below the surface 106 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, an underlying rock layer 114, and a hydrocarbon-saturated layer 116. One or more elements of the subsurface volume 104, such as the first sediment layer 110 and the uplifted rock layer 112, can be an overburden for the hydrocarbon-saturated layer 116. In some instances, the overburden may include salt.

FIG. 1 shows an example of a first marine survey vessel 118-1 equipped to carry out marine surveys in accordance with the present disclosure. In particular, the first marine survey vessel 118-1 can tow one or more streamers 120 (shown as one streamer for ease of illustration) generally located below the sea surface 109. The streamers 120 can be cables containing power and data-transmission lines (e.g., electrical, optical fiber, etc.) to which receivers may be coupled. In at least one type of marine survey, each receiver, such as the receiver 122 represented by the shaded disk in FIG. 1, comprises a pair of sensors including a geophone that detects particle displacement within the water by detecting particle motion variation, such as velocities or accelerations, and/or a receiver that detects variations in pressure. However, embodiments are not so limited. Surveys can include receivers 122 that are only pressure sensors, pressure and motion sensors, electromagnetic sensors, or optical fiber sensors, among others. In one type of marine survey, each receiver, such as the receiver 122, comprises an electromagnetic receiver that detects electromagnetic energy within the water. The streamers 120 and the first marine survey vessel 118-1 can include sensing electronics and data-processing facilities that allow receiver readings to be correlated with absolute locations on the sea surface and absolute three-dimensional locations with respect to a three-dimensional coordinate system. In FIG. 1, the receivers along the streamers 120 are shown to lie below the sea surface 109, with the receiver locations correlated with overlying surface locations, such as a surface location 124 correlated with the location of receiver 122.

In at least one embodiment, the first marine survey vessel 118-1 can tow a first source 126-1 that produces signals as the first marine survey vessel 118-1 and streamers 120 move across the sea surface 109. However, in at least one embodiment, the first marine survey vessel 118-1 does not tow a source. The first source 126-1 can be an impulsive marine survey source such as an air gun or a non-impulsive survey source such as a marine vibrator. The first source 126-1 can represent multiple sources, such as a source array, although illustrated as a point. Another source 126-2 can be towed by a second marine survey vessel 118-2. Either or both of the marine survey vessels 118 can include a controller 119. For example, the first marine survey vessel 118-1 can include a first controller 119-1 and the second marine survey vessel 118-2 can include a second controller 119-2. In at least one embodiment, a single controller 119 can be distributed between the first marine survey vessel 118-1 and the second marine survey vessel 118-2. The first controller 119-1 can be coupled to the first source 126-1 to control actuation of the first source 126-1 and the second controller 119-2 can be coupled to the second source 126-2 to control actuation of the second source 126-2. Although not specifically illustrated in FIG. 1, the first controller 119-1 can be coupled to a drag control device associated with the streamers 120. The controller 119 is described in more detail with respect to FIG. 15.

FIG. 1 shows acoustic energy illustrated as an expanding, spherical signal, illustrated as semicircles of increasing radius centered at the first source 126-1, representing a first down-going wavefield 128-1, following a signal emitted by the first source 126-1. An analogous expanding, spherical signal, illustrated as semicircles of increasing radius centered at the second source 126-2, representing a second down-going wavefield 128-2, following a signal emitted by the second source 126-2. The down-going wavefields 128 are, in effect, shown in a vertical plane cross section in FIG. 1. The outward and downward expanding down-going wavefields 128 may eventually reach the surface 106, at which point the outward and downward expanding down-going wavefields 128 may partially scatter, may partially reflect back toward the streamers 120, and may partially refract downward into the subsurface volume 104, becoming elastic signals within the subsurface volume 104.

In at least one embodiment of the present disclosure, the first marine survey vessel 118-1 can navigate at a relatively low speed and the second marine survey vessel 118-2 can navigate at a relatively high speed. The marine survey vessels 118 have different instantaneous and average velocities. Instantaneous velocity is a vector quantity that is the rate of change of an object's position with respect to a frame of reference and is a function of time. Instantaneous velocity is equivalent to a specification of an object's speed and direction of motion. Average velocity is the constant velocity that would provide the same resultant displacement as a variable velocity in the same time interval over a period of time. The scalar absolute value (magnitude) of velocity is speed. Average speed in an interval is the distance travelled by the object divided by the duration of the interval. The average velocities of the marine survey vessels 118 can be broken down into components in an x-direction and in a y-direction. Despite navigating at different average velocities, the first marine survey vessel 118-1 can navigate at a same average velocity in the x-direction as the second marine survey vessel 118-2. In other words, the components of the average velocities of the marine survey vessels 118 in a direction of navigation of the first marine survey vessel and/or in the direction of the first survey route can be the same. In at least one embodiment, the first marine survey vessel 118-1 can navigate in a relatively straight line in the x-direction, while the second marine survey vessel 118-2 navigates in a non-straight line either near a tail of the streamers 120, over the streamers 120, or combinations thereof while the first marine survey vessel 118-1 navigates in the straight line. As used herein, "navigate" refers to the movement of a vessel through water.

Figure 2:
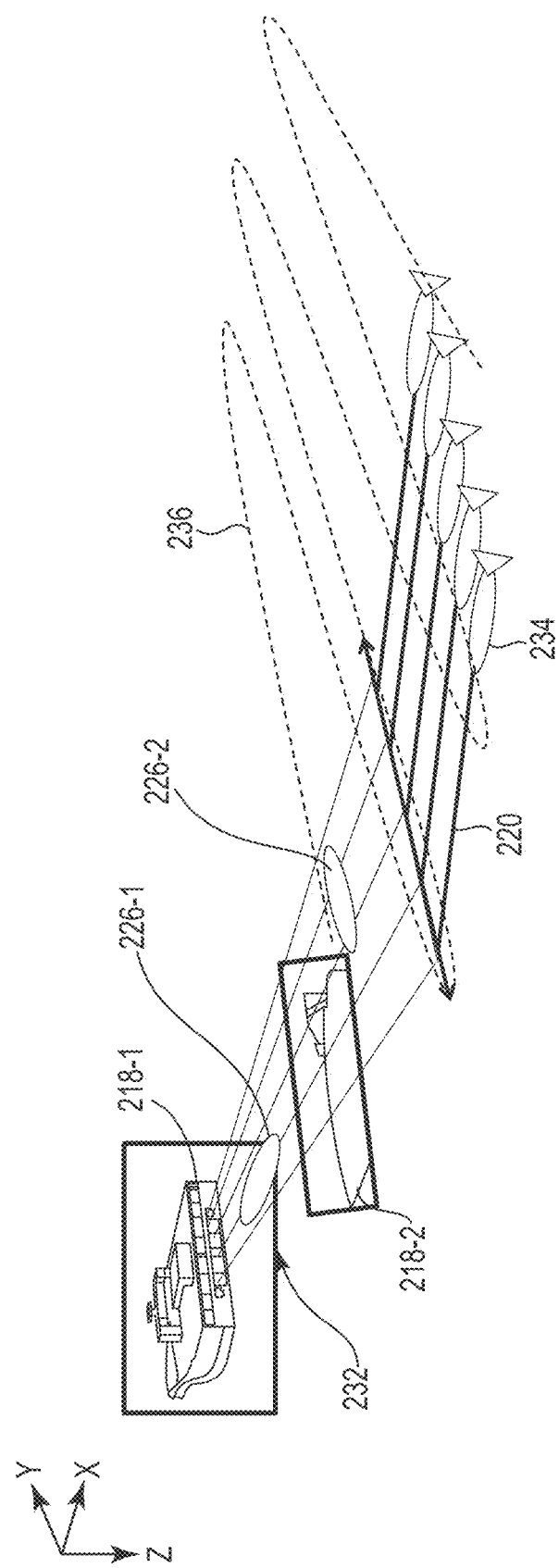
FIG. 2 is a perspective view of an exemplary embodiment of a marine survey source route configuration.

FIG. 2 is a perspective view of an exemplary embodiment of a marine survey source route configuration. A first marine survey vessel 218-1 can follow a survey route that can be generally straight, curved, or coil shaped, for example. The first marine survey vessel 218-1 can tow a spread of streamers 220 via towing equipment 232. The towing equipment 232 can maintain the streamers 220 at a selected depth and lateral positions with respect to each other and with respect to the first marine survey vessel 218-1. For example, the towing equipment 232 can include paravane tow lines coupled to the first marine survey vessel 218-1 by way of onboard winches. The paravane tow lines can be coupled to paravanes through other lines called a bridle. The paravanes can provide a lateral force to the streamers 220 when the paravanes are towed in the water. Additional examples of towing equipment 232 include spreader lines and spur lines, among other towing equipment 232.

In at least one embodiment, the first marine survey vessel 218-1 can also tow a first source 226-1. The first source 226-1 can include multiple source elements and may be referred to in the art as a single, double, or triple source, among other configurations. In at least one embodiment, the first marine survey vessel does not tow a source 226. Some jurisdictions may not allow operation of sources 226 by multiple marine survey vessels 218. In at least one embodiment, the first marine survey vessel 218-1 does not tow a first source 226-1.

The first marine survey vessel 218-1 can navigate at a relatively low speed compared to the second marine survey vessel 218-2. In at least one embodiment, the first marine survey vessel can navigate at a speed less than a design minimum speed in order to maintain adequate tension on the streamers 220. By way of example, the streamers 220 may be designed such that they are to be towed at a minimum speed of four knots in order to generate enough drag to maintain sufficient tension along the streamers to promote a generally straight profile and/or directional control thereof. In such an example, according to the present disclosure, the first marine survey vessel 218-1 can travel at a speed slower than four knots. In order to account for the reduced tension on the streamers 220, drag control devices 234 can be coupled at or near a tail of the streamers 220. The drag control devices 234 can maintain a desired profile, such as a straight line or fan profile, for each of the streamers 220, even at low speed. The drag control devices 234 can maintain a geometry of the spread of streamers 220. FIG. 2 illustrates one drag control device 234 coupled to each respective streamer 220, however embodiments are not so limited. In at least one embodiment, one drag control device 234 can be coupled to more than one streamer 220.

In at least one embodiment, the desired profile of the streamers 220 can be passively maintained by the drag control device 234. For example, the drag control device 234 can apply a tensile force to a streamer 220 that is generated by interaction of the shape of the drag control device 234 with the stream of water generated by the towing in a similar fashion to a floating anchor or drift sock. Such a drag control device 234 may be referred to as a passive drag control device.

In at least one embodiment, the drag control device 234 can provide kinetic energy recovery for the first marine survey vessel 218-1. According to the present disclosure, some of the energy associated with the drag force generated by the drag control device 234 can be harnessed and supplied to the first marine survey vessel 218-1 via transmission lines running from the drag control device 234 along the streamer 220 to the first marine survey vessel 218-1. Normally, it would not be desirable to apply extra drag to a marine vessel. However, as described herein, it is advantageous to apply extra drag to the streamers 220 so that they can be towed slowly while maintaining a desired profile. Some of the energy lost to drag can be reharnessed. For example, some of the drag generated by a passive drag control device 234 can be created by a non-powered propeller attached thereto. Towing the drag control device 234, and thus the propeller, through the water can cause the propeller to turn, which can create additional drag, but can also power a generator coupled to the propeller. The generator can supply energy back to the first marine survey vessel 218-1 directly or power a battery for later use by or transmission to the first marine survey vessel 218-1 or other equipment associated therewith.

In at least one embodiment, the desired profile of the streamers 220 can be actively maintained by the drag control devices 234. For example, a drag control device 234 can apply a tensile force to a streamer 220 that is generated by a motor of the drag control device 234, which turns a propeller to generate force in a direction opposite of a direction in which the streamer 220 to which the drag control device 234 is coupled is being towed. The force generated by the active drag control device 234 can be variable. For example, the motor can have variable speeds or power settings. In at least one embodiment, the motor of the active drag control device 234 can be directionally controlled to provide steering control and depth control for a tail of the streamers 220. The directional control can be provided by thrust vectoring, for example, via nozzles coupled to the motor, or via an ability of the motor itself to be repositioned, for example, by a gimballed or pivoted connection to the drag control device 234.

The streamers 220 can be a spread of multi-sensor, short streamers that are flat towed deep in a fluid volume, such as the fluid volume 108 illustrated in FIG. 1. In the context of FIGS. 2, 4A, and 5A-5B, "short" refers to streamers that are 5000 meters in length or less. The length of the streamers can be chosen based on the desired fold and offset diversity. A maximum offset is survey dependent according to water depth, target depth, and geophysical parameters such as amplitude versus offset. The spread of streamers 220 can be towed at depths of at least 25 meters to allow for a second marine survey vessel 218-2 to pass over the spread of streamers 220. Additional advantages to such deep towing include a reduction in towing noise and swell noise recorded by the streamers 220 because of the deep depth and low speed.

A large spread of streamers 220 can mitigate for the low towing speed with fewer sail lines to be acquired for a given survey area. As a non-limiting example, the spread towed by the first marine survey vessel 218-1 can include 14 streamers 220, each spaced apart by 150 meters. Although not specifically illustrated, the streamers 220 can be coupled to an acoustic network control and position control system, which may be referred to in the art as birds.

A second marine survey vessel 218-2 can tow a second source 226-2 along a second survey route 236. For example, the second survey route 236 can have a "Z" shape (a zigzag route) that crosses the survey route at various angles. Other examples of non-straight-line survey routes 236 include a racetrack route and a serpentine or "S" shape that traverses back and forth across the sail line of the first marine survey vessel 218-1 (a sinusoidal route), among others.

A zigzag route is characterized by a plurality of generally straight linear paths overlapping the route of the first marine survey vessel 218-1 and having generally sharp turns between the linear paths. A plan view plot of such a zigzag route resembles a sawtooth graph (although the second marine survey vessel 218-2 may not be able to make such precisely sharp turns). In practice, the turns may be rounded off, creating a survey route 236 having a shape somewhere between a "Z" shape and an "S" shape. The angle and the lateral extension of the zigzag survey route of the second marine survey vessel 218-2 can be based on a ratio between the speeds of the first marine survey vessel 218-1 and the second marine survey vessel 218-2. A relatively high ratio between the speeds can result in improved subsurface illumination for all offsets and azimuths. The ratio between the speeds can constrain a maximum lateral offset (between the second source 226-2 and the receivers on the streamers 220). A relatively high ratio between speeds allows the second marine survey vessel 218-2 to take greater lateral extensions across the spread of streamers because it can navigate farther while maintaining the same average velocity in the in-line direction, which is illustrated as being along the x-axis, as the first marine survey vessel 218-1. The lateral extension of the zigzag survey route of the second marine survey vessel 218-2 can be on either side of the spread of streamers 220 during advancement of the marine acquisition, which can yield a plan view plot of the sail lines resembling a "ZZ" geometry. The missing-side illumination can be compensated by overlap of a subsequent sail line as illustrated in more detail in FIG. 3B.

A racetrack route is characterized by a series of generally obround paths that are offset from each other. An individual obround path is a path with parallel lines connected by semicircles on the ends of the parallel lines. A plan view plot of a racetrack route can resemble an obround helix. A sinusoidal route is characterized by a plurality of generally curved paths overlapping the in-line route of the first marine survey vessel 218-1 and having generally rounded turns between the linear paths. A plan view plot of such a sinusoidal path resembles a wave, such as a sine wave. The non-straight-line survey route 236 of the second marine survey vessel 218-2 can be entirely over the streamers 220, partially over the streamers 220, near a tail of the streamers, or behind the streamers 220. Using the decoupled source-receiver scheme of the present disclosure, at least one embodiment can include a second pass (for both the first marine survey vessel 218-1 and the second marine survey vessel 218-2 along a given survey line) with different settings for a very long offset and full-waveform inversion (FWI) velocity model building.

The streamers 220 can have any offset from the first source 226-1 or the second source 226-2. Medium to long, long, and very long offsets from the first source 226-1 may be beneficial because marine survey data for short offsets can be acquired based on operation of the second source 226-2 and the non-straight-line survey path 236. Longer offsets from the first source 226-1 can also allow for wider towing of the streamers 220 (for the same angle provided by the paravanes, the spread will be wider, which is illustrated by a comparison of FIGS. 4A and 4B). As used herein, offsets from 0 to 1000 meters are "short", offsets from 1000 to 2000 meters are "short to medium", offsets from 2000 m to 3000 meters are "medium to long", offsets from 3000 to 4000 meters are "long", and offsets greater than 4000 m are "very long".

The second marine survey vessel 218-2 can navigate at a second average speed that is greater than the average speed of the first marine survey vessel 218-1. Both the first marine survey vessel 218-1 and the second marine survey vessel 218-2 can navigate at the same average velocity in the direction of navigation of the first marine survey vessel 218-1 in the in-line direction. Having the same average velocity in the in-line direction can enable performance of the marine survey in a homogenous way. For example, both the first marine survey vessel 218-1 and the second marine survey vessel 218-2 having the same average velocity in the in-line direction allows the second marine survey vessel 218-2 to advance generally along the survey route of the first marine survey vessel 218-1 along with the first marine survey vessel 218-1 despite the second marine survey vessel 218-2 taking a longer route 236.

In at least one embodiment, the second source 226-2 towed by the second marine survey vessel 218-2 can be configured for near-continuous actuation. The second source 226-2 can be an individual source element or an array of air guns, marine vibrators, and combinations thereof. The second marine survey vessel 218-2 can tow any type of source 226-2 that is mechanically stable at the relatively high speed of the second marine survey vessel 218-2.

The second marine survey vessel 218-2 can be human-operated or autonomously operated. The second marine survey vessel 218-2 can be controlled from another marine survey vessel, such as the first marine survey vessel 218-1.

FIG. 3A is a plan or xy-plane 338 view of a first exemplary embodiment of a marine survey source route configuration for two sources with a low ratio of speed. The two sources include the first source 326-1 towed by the first marine survey vessel 318-1 and the second source 326-2 towed by the second marine survey vessel 318-2. A first marine survey vessel 318-1 can follow a survey route 335 that is generally straight or can be curved or coil shaped. The first marine survey vessel 318-1 can tow a spread of streamers 320. The streamers 320 can be coupled to drag control devices 334. The first marine survey vessel 318-1 can navigate at a relatively low speed compared to the second marine survey vessel 318-2, but at a same average velocity in the in-line direction. The second marine survey vessel 318-2 can tow the second source 326-2 along a non-straight-line survey path 336A.

FIG. 3B is a plan or xy-plane 338 view of a second exemplary embodiment of a marine survey source route configuration for two sources with a high ratio of speed. FIG. 3B is analogous to FIG. 3A, except that the non-straight-line survey path 336B of the second marine survey vessel 318-2 traverses a wider path with greater lateral extensions outside the streamers 320 than the non-straight-line survey path 336A illustrated in FIG. 3A. The ratio of speed refers to the ratio of speed between the second marine survey vessel 318-2 and the first marine survey vessel 318-1. The low ratio of speed illustrated in FIG. 3A is indicated by the path 336A of the second marine survey vessel 318-2 having narrower lateral extensions on the sides of the streamers 320 than the path 336B of the second marine survey vessel 318-2 in FIG. 3B. In FIG. 3B, because the second marine survey vessel 318-2 is navigating at a speed significantly greater than that of the first marine survey vessel 318-1, it has time to traverse a wider path with greater lateral extensions outside the streamers 320 while still maintaining pace with the first marine survey vessel 318-1 along its path 335 in the in-line direction.

Figure 4A:
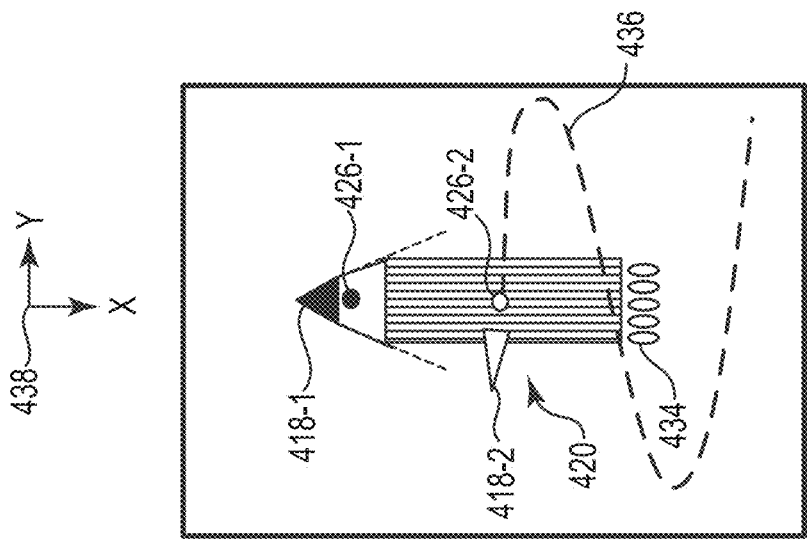
FIG. 4A is a plan or xy-plane view of an exemplary embodiment of a marine survey source route configuration for two sources with wide towing.
Figure 4B:
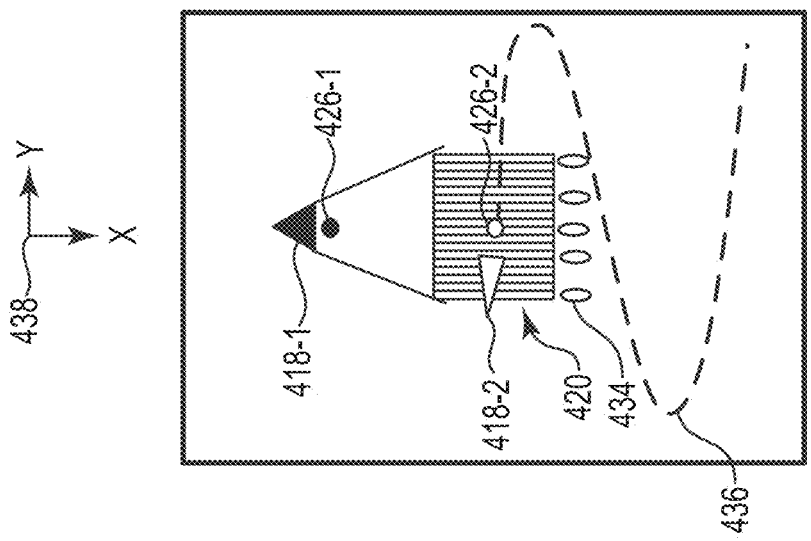
FIG. 4B is a plan or xy-plane view of an exemplary embodiment of a marine survey source route configuration for two sources with narrow towing.

FIG. 4A is a plan or xy-plane 438 view of an exemplary embodiment of a marine survey source route configuration for two sources 426-1, 426-2 with wide towing. The first marine survey vessel 418-1 in FIG. 4A employs wide towing of the spread of streamers 420. Wide towing is useful for receiving marine survey data with medium to long offsets. FIG. 4B is analogous to FIG. 4A, except that the first marine survey vessel 426-1 employs narrow towing of the spread of streamers 420 in FIG. 4B. Narrow towing is useful for receiving marine survey data with offsets from short to long. Whether employing wide or narrow towing, drag control devices 434 can be associated with one or more of the streamers. The second marine survey vessel 418-2 towing the second source 426-2 can follow a non-straight-line survey route 436 as described herein. In at least one embodiment, the quantity of streamers 420 used with wide and narrow towing can be the same but spaced farther apart for wide towing. In at least one embodiment, the quantity of streamers 420 used with wide towing can be greater than the quantity used for narrow towing. When employing narrow towing, it can be beneficial to use longer streamers 420 than are used with wide towing, however embodiments are not so limited.

FIG. 5A is a plan or xy-plane 538 view of an exemplary embodiment of a marine survey source route configuration for two sources 526-1, 526-2 with center crossing. Center crossing means that the non-straight-line survey path 536A of the second marine survey vessel 518-2 crosses over the spread of streamers 520 near a center of the spread in the in-line and crossline directions. As illustrated in FIGS. 5A-5B versus FIG. 5C, the streamers 520 can have a relatively short length. Whether long or short, the streamers 520 can be coupled to drag control devices 534. Although not specifically illustrated, in at least one embodiment, the non-straight-line survey path 536A can include portions that cross over the spread of streamers 520 both near a tail of the streamers 520 and near a center the spread of streamers 520.

FIG. 5B is a plan or xy-plane 538 view of an exemplary embodiment of a marine survey source route configuration for two sources 526-1, 526-2 with tail crossing. FIG. 5B is analogous to FIG. 5A, except that the non-straight-line survey path 536B of the second marine survey vessel 318-2 crosses over the spread of streamers 520 near a tail of the spread rather than over a more central portion as illustrated in FIG. 5A. The second marine survey vessel 518-2 can tow the second source 526-2 over the tail of the streamers 520 and the drag control devices 534 as indicated by the non-straight-line survey path 536B.

FIG. 5C is a plan or xy-plane 538 view of an exemplary embodiment of a marine survey source route configuration for one source 526-2 with center crossing. The one source 526-2 is towed by the second marine survey vessel 518-2. In this embodiment, the first marine survey vessel 518-1 does not tow a source. In FIG. 5C, the spread of streamers 520 is relatively longer than that illustrated in FIGS. 5A and 5B. An example range of such a "relatively longer" length is 5000 meters to 8000 meters, but 8000 meters is not an upper limit. The longer streamers 520 can facilitate receiving data over the desired azimuths using only one source 526-2. In FIGS. 5A and 5B, the shorter streamers 520 are sufficient to receive data over the desired azimuths because two sources 526-1, 526-2 are used in those embodiments. Furthermore, in FIG. 5C, the non-straight-line path 536C of the second marine survey vessel 518-2 can cross over the center of the spread of streamers 520. In at least one embodiment, the non-straight-line survey path 536C can cross over the center of the spread of streamers 520 on each leg of the non-straight-line survey path 536C. For example, if the non-straight-line survey path 536C is zigzag, each line making up the "Z" shape can cross over the center of the spread of streamers 520. In at least one embodiment, the non-straight-line survey path 536C can cross over the streamers 520 moving from a tail of the streamers 520 over the drag control devices 534 to a center of the spread of streamers 520.

Figures 6A, 6B, 6C, 6D:
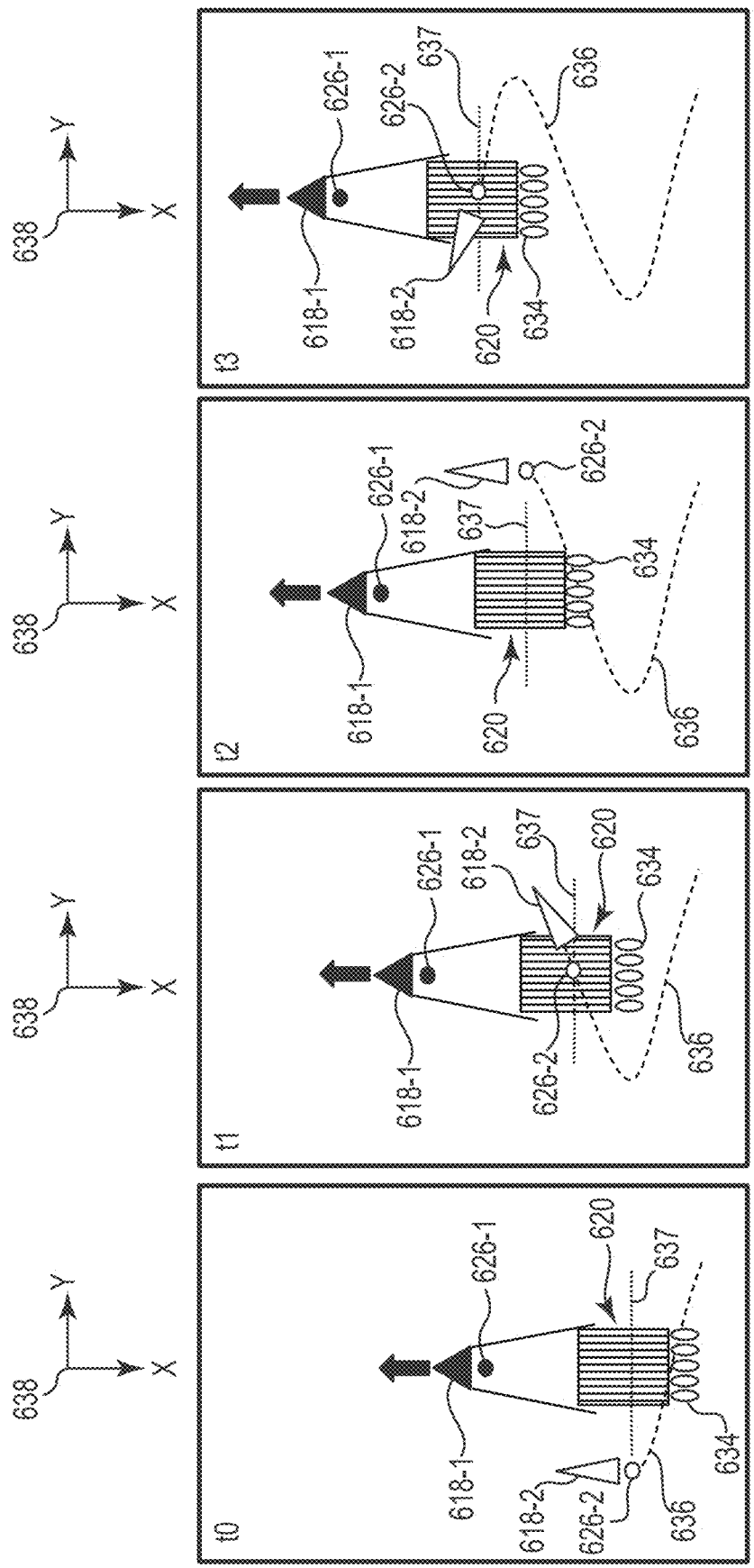
FIG. 6A is a plan or xy-plane view of an exemplary embodiment of a marine survey source route configuration for two sources with center crossing at a first time.
FIG. 6B is a plan or xy-plane view of an exemplary embodiment of a marine survey source route configuration for two sources with center crossing at a second time.
FIG. 6C is a plan or xy-plane view of an exemplary embodiment of a marine survey source route configuration for two sources with center crossing at a third time.
FIG. 6D is a plan or xy-plane view of an exemplary embodiment of a marine survey source route configuration for two sources with center crossing at a fourth time.

FIGS. 6A-6D illustrate plan or xy-plane 638 views of an exemplary embodiment of a marine survey source route configuration for two sources 626-1, 626-2 with center crossing at subsequent times (t0, t1, t2, t3). The sequence illustrated in FIGS. 6A-6D is analogous to the embodiment illustrated in FIG. 5A, at different times. As illustrated in FIGS. 6B and 6D, the non-straight-line survey path 636 of the second marine survey vessel 618-2 crosses over the spread of streamers 620 near a center of the spread in the in-line and crossline directions. The relative position of the second source 626-2 is intended to remain as close as possible to the center of the spread of streamers 620 in the in-line direction as indicated by the line 637, regardless of where the second marine survey vessel 618-2 is located along the non-straight-line survey path 636. The line 637 in FIGS. 6A-6D also indicates that the position of the first source 626-1 relative to the second source 626-2 in the in-line direction remains constant or approximately constant. As illustrated in FIGS. 6A and 6C, portions of the non-straight-line survey path 636 can take the first marine survey vessel 618-1 along lateral extensions outside the spread of streamers 620 and associated drag control devices 634.

FIGS. 7A-7D illustrate a plan or xy-plane 738 view of an exemplary embodiment of a marine survey source route configuration for two sources 726-1, 726-2 with tail crossing at subsequent times (t0, t1, t2, t3). The sequence illustrated in FIGS. 7A-7D is analogous to the embodiment illustrated in FIG. 5B, at different times. As illustrated in FIGS. 7B and 7D, the non-straight-line survey path 736 of the second marine survey vessel 718-2 crosses over the spread of streamers 720 near a tail of the spread in the in-line and crossline directions, over or near the drag control devices 734. The relative position of the second source 726-2 is intended to remain as close as possible to the tail of the spread of streamers 720 in the in-line direction as indicated by the line 739, regardless of where the second marine survey vessel 718-2 is located along the non-straight-line survey path 736. The line 739 in FIGS. 7A-7D also indicates that the position of the first source 726-1 relative to the second source 726-2 in the in-line direction remains constant or approximately constant. As illustrated in FIGS. 7A and 7C, portions of the non-straight-line survey path 736 can take the first marine survey vessel 718-1 along lateral extensions outside the spread of streamers 720.

Figures 8A, 8B, 8C, 8D:
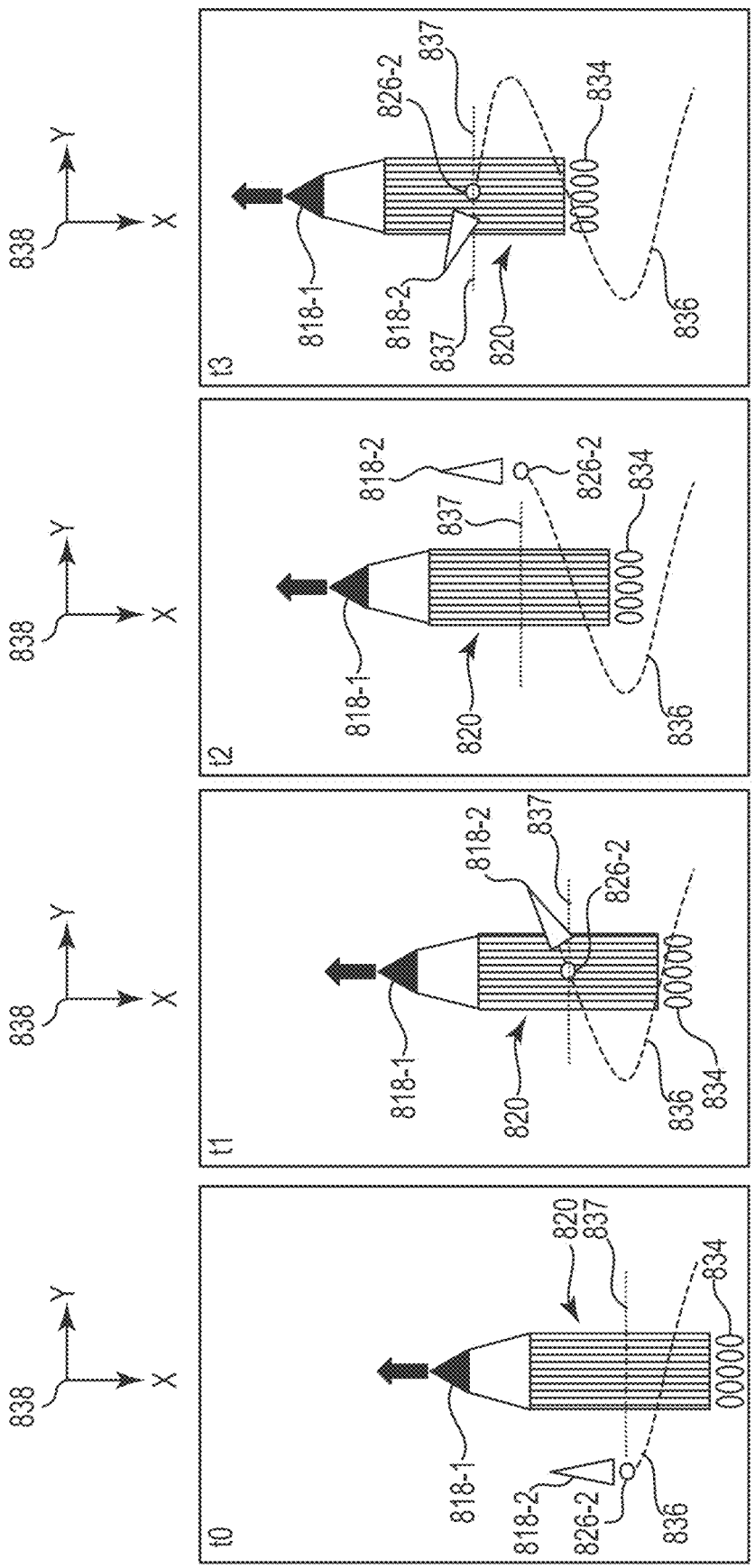
FIG. 8A is a plan or xy-plane view of an exemplary embodiment of a marine survey source route configuration for one source with center crossing at a first time.
FIG. 8B is a plan or xy-plane view of an exemplary embodiment of a marine survey source route configuration for one source with center crossing at a second time.
FIG. 8C is a plan or xy-plane view of an exemplary embodiment of a marine survey source route configuration for one source with center crossing at a third time.
FIG. 8D is a plan or xy-plane view of an exemplary embodiment of a marine survey source route configuration for one source with center crossing at a fourth time.

FIGS. 8A-8D illustrate a plan or xy-plane 838 view of an exemplary embodiment of a marine survey source route configuration for one source 826-2 with center crossing at subsequent times (t0, t1, t2, t3). The sequence illustrated in FIGS. 8A-8D is analogous to the embodiment illustrated in FIG. 5C, at different times. As illustrated in FIGS. 8B and 8D, the non-straight-line survey path 836 of the second marine survey vessel 818-2 crosses over the spread of streamers 820 near a center of the spread in the in-line and crossline directions. The relative position of the second source 826-2 is intended to remain as close as possible to the center of the spread of streamers in the in-line direction as indicated by the line 837, regardless of where the second marine survey vessel 818-2 is located along the non-straight-line survey path 836. The line 837 in FIGS. 8A-8D also indicates that the position of the second source 826-2 relative to the first marine survey vessel 818-1 in the in-line direction remains constant or approximately constant. As illustrated in FIGS. 8A and 8C, portions of the non-straight-line survey path 836 can take the first marine survey vessel 818-1 along lateral extensions outside the spread of streamers 820 and associated drag control devices 834.

FIGS. 9A-9D illustrate a plan or xy-plane 938 view of an exemplary embodiment of a marine survey source route configuration for two sources 926-1, 926-2 and fanned streamers 920 at subsequent times (t0, t1, t2, t3). As illustrated in FIGS. 9B and 9D, the non-straight-line survey path 936 of the second marine survey vessel 918-2 crosses over the spread of streamers 620 near a center of the spread in the in-line and crossline directions. The relative position of the second source 926-2 is intended to remain as close as possible to the center of the spread of streamers in the in-line direction as indicated by the line 937, regardless of where the second marine survey vessel 918-2 is located along the non-straight-line survey path 936. The line 937 in FIGS. 9A-9D also indicates that the position of the first source 926-1 relative to the second source 926-2 in the in-line direction remains constant or approximately constant. As illustrated in FIGS. 9A and 9C, portions of the non-straight-line survey path 936 can take the first marine survey vessel 918-1 along lateral extensions outside the spread of streamers 920 and associated drag control devices 934. However, the lateral extensions may not extend as far outside the spread of streamers 920 because they are fanned out wider than in straight towing embodiments.

Figure 10:
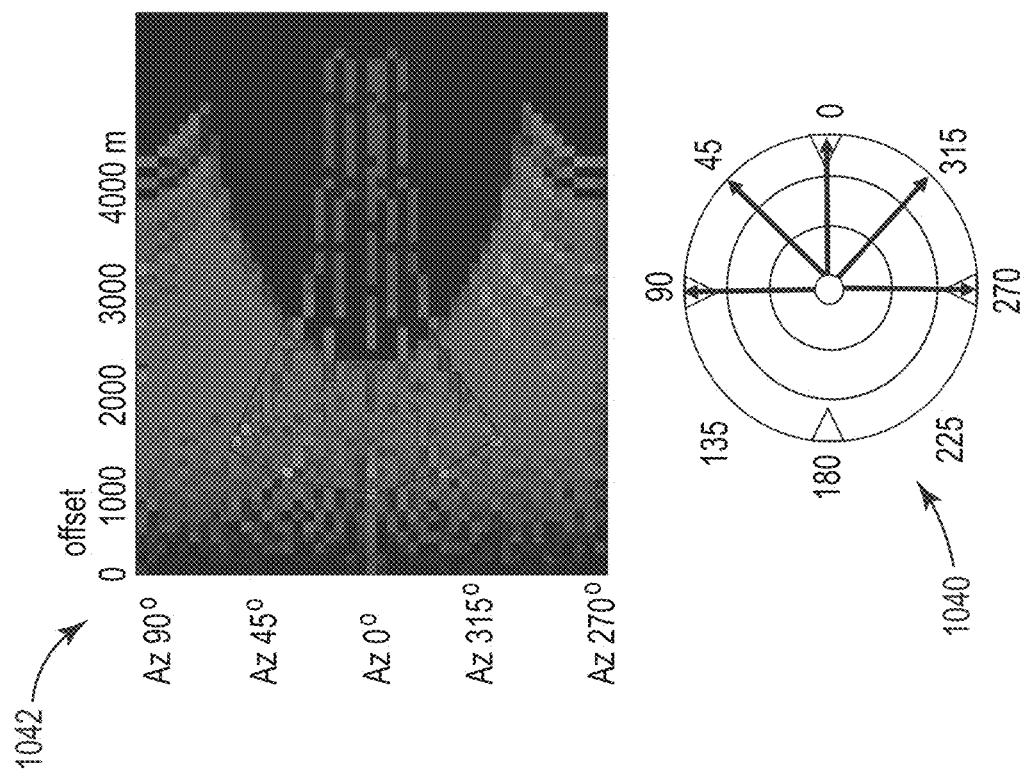
FIG. 10 is a color plot of an example of a global fold distribution.

FIG. 10 is a color plot 1042 of an example of a global fold distribution. As used herein, "fold" refers to a density of contributions to an illumination of a subsurface location from source and receiver pairs. As used herein, "azimuth" refers to the angle between a source and receiver pair. The azimuth is typically measured relative to an axis in line with the direction of navigation of the marine survey vessel towing the streamers (and source), which corresponds to the x-axis as illustrated in the present disclosure. FIG. 10 includes a compass rose 1040 showing the relevant azimuths. FIG. 10 also includes a color plot 1042 of the global fold distribution for azimuths from 0 degrees to 90 degrees and from 0 degrees (360 degrees) to 270 degrees for offsets from 0 to 4000 meters. A non-limiting example setup for FIG. 10 includes a spread of streamers that is 2000 meters wide and 5000 meters long having at least a 1000 meter offset, with 5 streamers spaced 500 meters apart, or with 9 streamers spaced 250 meters apart. The example setup also includes a 6000 meter wide (in the crossline direction) non-straight-line survey path for the second marine survey vessel in order to have a 4000 meter maximum offset at 90 degrees.

The first marine survey vessel, which tows the streamers, and in the embodiment illustrated also tows a source, has source-receiver pairs that contribute to the fold as indicated by the red portions of the plot 1042. The source-receiver pairs for the first marine survey vessel contribute principally to the in-line azimuth (Az 0°) for medium to long offsets, such as from about 2000 meters to 4000 meters. The source-receiver pairs for the first marine survey vessel also contribute to the short to medium offsets, from about 1000 meters to 2000 meters with less fold but with a greater range of azimuths (Az 0°-45° and Az 360°-315°). The second marine survey vessel, which tows a source but no receivers, has source-receiver pairs (for the receivers towed by the first marine survey vessel) that contribute to the fold as indicated by the light blue portions of the plot 1042. The source-receiver pairs for the second marine survey vessel contribute principally to the subline azimuths (Az 45°-90° and Az 315°-270°) for medium to long offsets. The source-receiver pairs for the second marine survey vessel also provide full azimuth illumination (Az 0°-90° and Az 360°-270°), albeit with less density, for short offsets, such as from 0 to 2000 meters. The combination contributions from the first marine survey vessel and the second marine survey vessel provides full azimuth full fold distribution at offsets from about 1000 meters to 2000 meters.

Figure 11B:
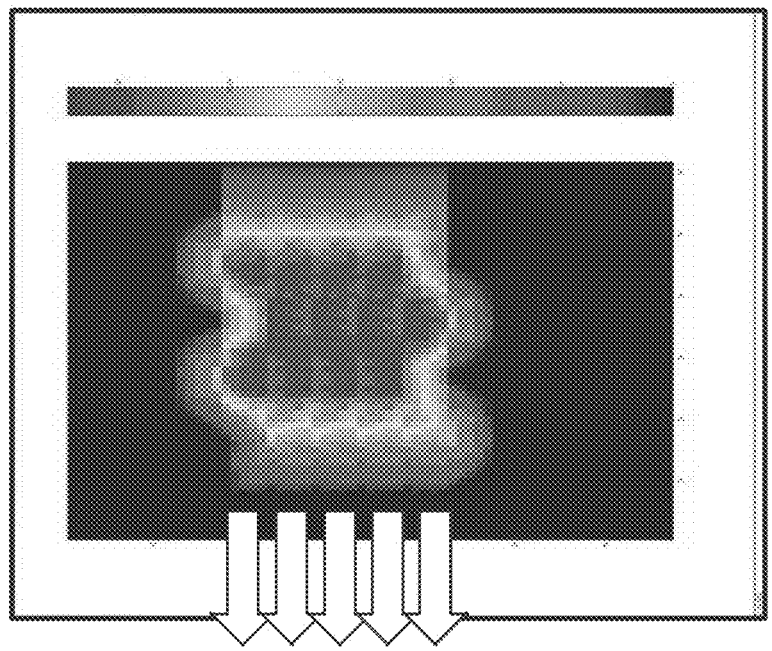
FIG. 11B is a color plot of an example of a five sail line fold indicated for all offset classes and azimuths.
Figure 11A:
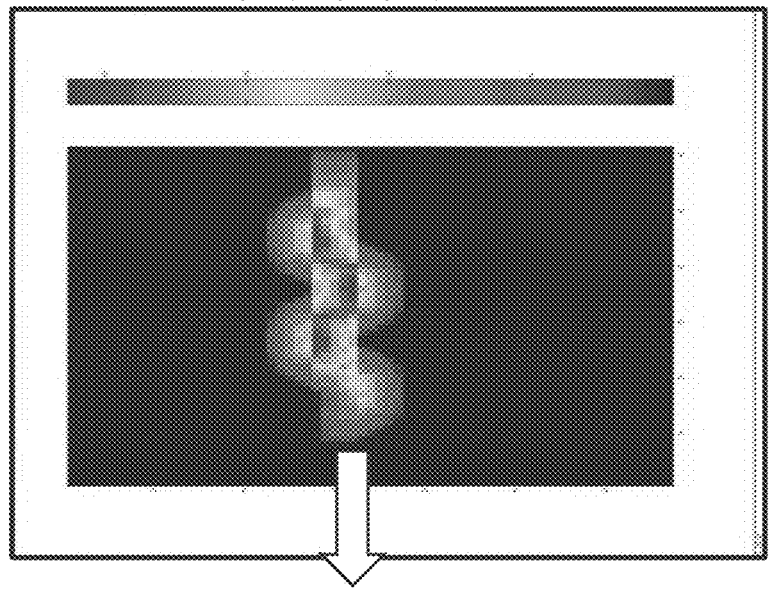
FIG. 11A is a color plot of a single sail line fold indicated for all offset classes and azimuths.

FIG. 11A is a color plot 1144 of an example of a single sail line fold indicated for all offset classes and azimuths. The density of the fold is indicated by the scale on the right side of the plot 1144 and is the same for FIGS. 11A, 11B, 12, and 13. The red end of the scale indicates greater density and the violet end of the scale indicates lesser density. Thus, the fold increases from the bottom to the top of the scale. Greater fold is preferred. The generally rectangular-shaped portion of the fold that is in line with the arrow represents contributions to the fold from source receiver pairs of the first marine survey vessel. The arrow represents one sail line. The generally sinusoidal-shaped portion of the fold that is centered around the rectangular-shaped portion represents contributions to the fold from source receiver pairs of the second marine survey vessel (although the receivers are towed by the first marine survey vessel). The generally sinusoidal-shaped portion corresponds to a sinusoidal non-straight-line path taken by the second marine survey vessel. As can be seen in FIG. 11A, the density of the fold is greatest along the sinusoidal portion that overlaps with the rectangular-shaped portion, as may be expected because this is where both sources contribute to the fold.

FIG. 11B is a color plot 1146 of an example of a five sail line fold indicated for all offset classes and azimuths. Each of the five sail lines is analogous to the one sail line referenced in FIG. 11A. The five sail lines are adjacent sail lines. The generally rectangular-shaped portions of the fold that are in line with the arrows represent contributions to the fold from source receiver pairs of the first marine survey vessel. Each arrow represents one sail line. The generally sinusoidal-shaped portions of the fold that are centered around the rectangular-shaped portions represent contributions to the fold from source receiver pairs of the second marine survey vessel (although the receivers are towed by the first marine survey vessel). The generally sinusoidal-shaped portions correspond to sinusoidal non-straight-line paths taken by the second marine survey vessel. As can be seen in FIG. 11B, the density of the fold is greatest along the sinusoidal-shaped portions that overlap with the rectangular-shaped portions, and the overall density is greater than that illustrated in FIG. 11A because what is not covered by one particular sail line is made up for by adjacent sail lines, providing greater homogeneity to the fold.

Figure 12:
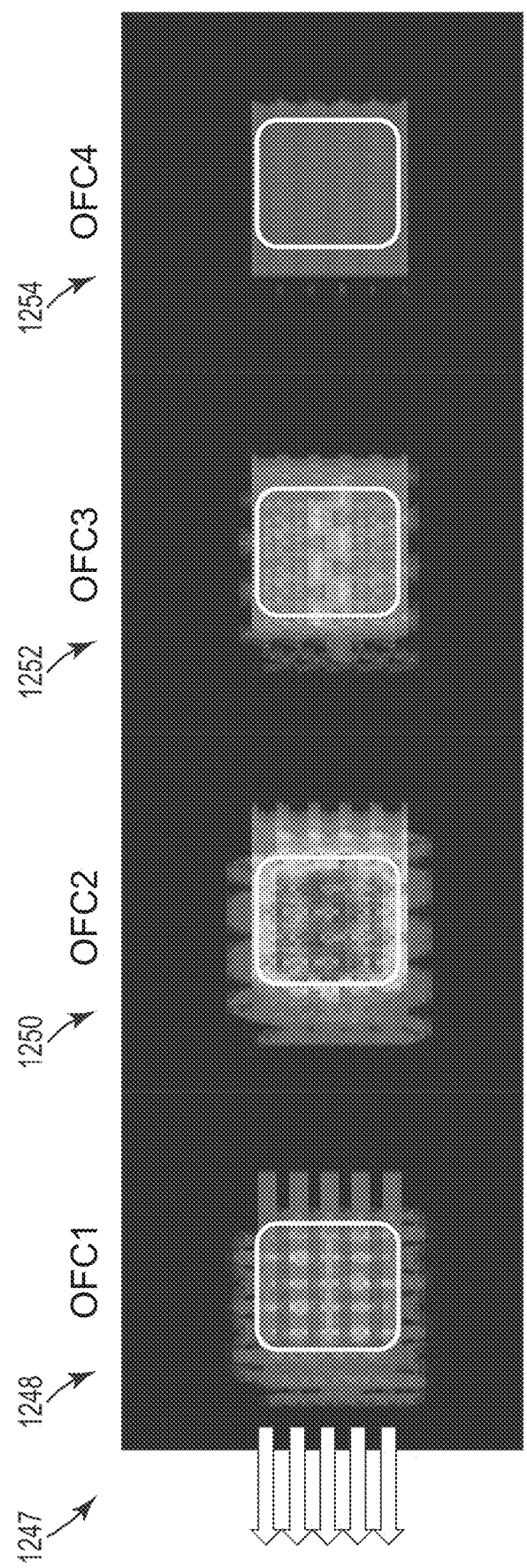
FIG. 12 is a color plot of an example of a five sail line fold indicated at four different offset classes for all azimuths.

FIG. 12 is a color plot 1247 of an example of a five sail line fold indicated at four different offset classes for all azimuths. The offsets are broken into four classes: a first offset class 1248, a second offset class 1250, a third offset class 1252, and a fourth offset class 1254. The plot 1247 illustrated in FIG. 12 relates to five sail lines indicated by the five arrows on the left side of the figure, which are analogous to the five sail lines described with respect to FIG. 11B. The quantity of sail lines and azimuths are used for illustrative purposes only and are not limitations on the present disclosure.

In at least one embodiment, the first offset class 1248 includes offsets from 0 to 1000 meters, which may be referred to as short offsets. The first offset class 1248 includes some bins indicating a medium to low fold by yellow-green colors and other adjacent bins indicating low to no fold by blue-violet colors. However, there may be sufficient fold in the medium to low fold bins to interpolate therebetween for the bins with low to no fold. Binning (dividing a grid) with large cells can increase the resolution of each cell, whereas binning with small cells can decrease the resolution of each cell.

The second offset class 1250 includes offsets from 1000 to 2000 meters, which may be referred to as short to medium offsets. The second offset class 1250 has the best illumination of any of the four classes as indicated by being almost entirely covered with high fold as indicated by the orange-red colors.

The third offset class 1252 includes offsets from 2000 to 3000 meters, which may be referred to as medium to long offsets. The third offset class 1252 has the second-best illumination as indicated by the medium fold density throughout most of the plot indicated by the yellow and yellow-green colors. Some portions of the third offset class 1252 have medium to medium-high fold that are generally along the sinusoidal path of the second marine survey vessel.

The fourth offset class 1254 includes offsets from 3000 to 4000 meters, which may be referred to as long offsets. The fourth offset class 1254 has poor illumination throughout as indicated by the low fold density throughout the plot as indicated by the blue-violet colors. There is a faint indication of the five sail lines of the first marine survey vessel and the sinusoidal path of the second marine survey vessel.

Figure 13:
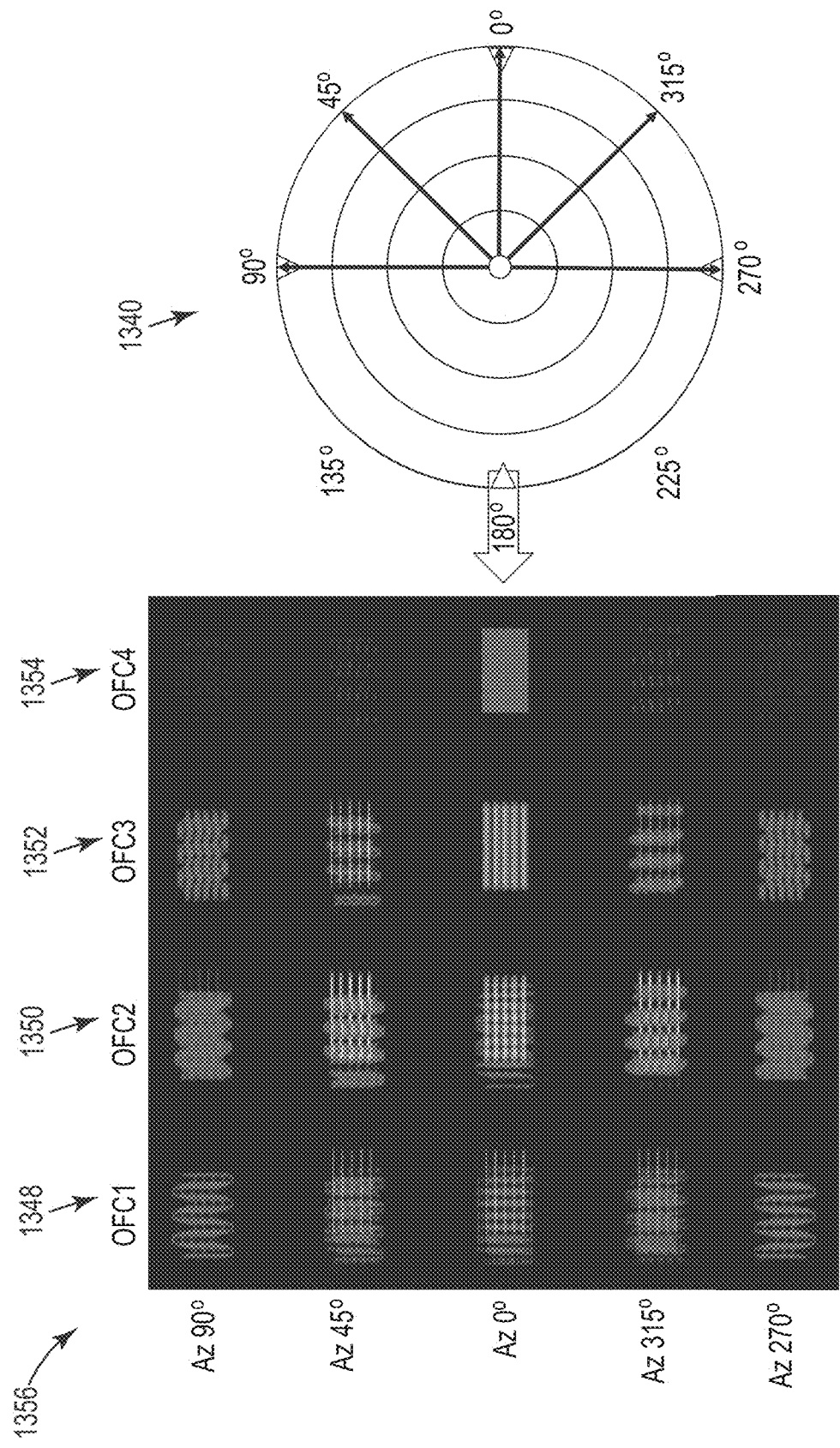
FIG. 13 is a color plot of an example of a five sail line fold indicated at four different offset classes for each of five different azimuths.

FIG. 13 is a color plot 1356 of an example of a five sail line fold indicated at four different offset classes for each of five different azimuths. The four offset classes in FIG. 13 are analogous to the four offset classes in FIG. 12. The five azimuths in FIG. 13 are analogous to the five azimuths in FIG. 10. Although five azimuths are illustrated in FIG. 13, two are the same (the 90 degree azimuth matches the 270 degree azimuth) because of reciprocity. FIG. 13 also includes a compass rose 1340 showing the relevant azimuths and the direction of the sail line indicated by the arrow at 180 degrees. Each annulus within the rose represents one of the offset classes, starting near the origin. The innermost annulus represents the first offset class 1348 from 0 to 1000 meters. The second annulus out represents the second offset class 1350 from 1000 to 2000 meters. The third annulus out represents the third offset class 1352 from 2000 to 3000 meters. The outermost annulus represents the fourth offset class 1354 from 3000 to 4000 meters. In the plot 1356, it is apparent that the folds illustrated for the 90 degree azimuth are the same images as the folds illustrated for the 270 degree azimuth. The folds illustrated for the 45 degree azimuth are mirror images of the folds illustrated for the 315 degree azimuth. This can be the case when the path taken by the second marine survey vessel is symmetric about a center of the path of the first marine survey vessel.

The contribution to the fold at the 90 degree and 270 degree azimuths is primarily from the second marine survey vessel as indicated by the light blue sinusoidal lines in the fold, particularly in the first offset class 1348. The fold at the 90 degree and 270 degree azimuths for the second offset class 1350 has a bit more contribution from the first marine survey vessel as indicated by the faint horizontal lines. The fold at the 90 degree and 270 degree azimuths for the third offset class 1352 has less contribution from the first marine survey vessel than the second offset class 1350, but more than the first offset class 1348. The contribution to the fold at the 90 degree and 270 degree azimuths for the fourth offset class 1354 is almost non-existent for either marine survey vessel.

The fold at the 45 degree and 315 degree azimuths for the first offset class 1348 shows contributions from both the first marine survey vessel as indicated by the horizontal lines and the second marine survey vessel as indicated by the sinusoidal lines. The fold at the 45 degree and 315 degree azimuths for the second offset class 1350 has strong contributions from the first marine survey vessel as indicated by the yellow-orange horizontal lines and good contributions from the second marine survey vessel as indicated by the sinusoidal lines. The fold at the 45 degree and 315 degree azimuths for the third offset class 1352 is similar to that of the first offset class 1348, with slightly stronger contributions from the first marine survey vessel as indicated by the warmer color of the horizontal lines. The fold at the 45 degree and 315 degree azimuths for the fourth offset class 1354 is almost non-existent, with a small contribution from the second marine survey vessel as indicated by the very faint sinusoidal lines.

The fold at the 0 degree azimuth for the first offset class 1348 shows contributions from the first marine survey vessel and the second marine survey vessel that are similar in intensity to those at the 45 degree and 315 degree azimuths for the first offset class 1348, except that the contribution from the first marine survey vessel is a bit stronger. The fold at the 0 degree azimuth for the second offset class 1350 shows stronger contributions from the first marine survey vessel and the second marine survey vessel compared to the first offset class 1348 as indicated by the more definite lines and warmer colors. The contribution to the fold at the 0 degree azimuth for the second offset class 1350 from the first marine survey vessel is wider in the crossline direction but is not as intense as the contribution to the fold at the 45 degree and 315 degree azimuths for the second offset class 1350 from the first marine survey vessel as indicated by the yellow-green color of the horizontal lines. The fold at the 0 degree azimuth for the third offset class 1352 shows relatively strong and wide contributions from the first marine survey vessel, but little to no contribution from the second marine survey vessel. The fold at the 0 degree azimuth for the fourth offset class 1354 shows almost completely filled contribution from the first marine survey vessel, albeit of a lesser intensity than for the third offset class 1352 as indicated by the light blue color. There is little to no contribution to the fold for the fourth offset class 1354 from the second marine survey vessel.

Figure 14:
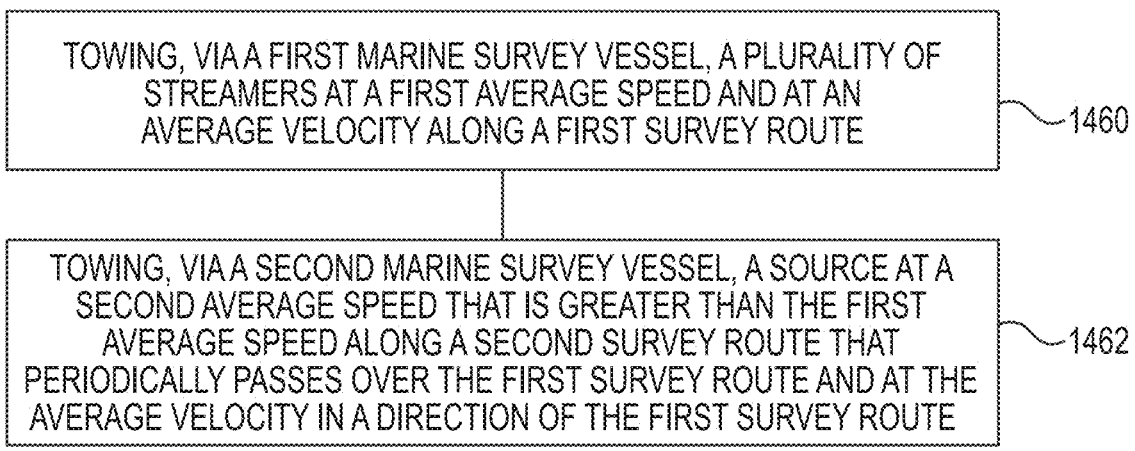
FIG. 14 illustrates an exemplary embodiment of a method for marine survey source route configuration.

FIG. 14 illustrates an exemplary embodiment of a method for marine survey source route configuration. At 1460, the method can include towing, via a first marine survey vessel, a plurality of streamers at a first average speed and at an average velocity along a first survey route.

At 1462, the method can include towing, via a second marine survey vessel, a source at a second average speed that is greater than the first average speed along a second survey route that periodically passes over the first survey route and at the average velocity in a direction of the first survey route. Periodically passing over means that the second survey route passes over the first survey route in a regular manner. The average velocity can be in line with a direction of navigation of the first marine survey vessel. In at least one embodiment, the second marine survey vessel can be controlled via the first marine survey vessel, for example, where the second marine survey vessel is a drone. The second marine survey vessel can tow the source near a tail of the streamers (in some embodiments directly over the tail of the streamers), over the streamers, and combinations thereof. The second survey route can be a zigzag route, a racetrack route, or a sinusoidal route, among other route types.

The method can include maintaining a desired profile for each of the plurality of streamers via a respective drag control device coupled to each of the plurality of streamers along the first survey route. The first average speed can be a speed at which the streamers, but for the drag control devices, would not generate enough drag to maintain a desired profile. In at least one embodiment, the desired profile of the streamers can be maintained passively by the drag control devices. In at least one embodiment, the desired profile of the streamers can be maintained actively by the drag control devices.

In at least one embodiment, the first marine survey vessel can also tow a source (an additional source to the source towed by the second marine survey vessel). The sources towed by the first and the second marine survey vessels can be actuated near-continuously or periodically. In at least one embodiment, the source towed by the second marine survey vessel can be actuated near-continuously along the second survey route and the source towed by the first marine survey vessel can be actuated along the first survey route. For example, the source towed by the second marine survey vessel can be a non-impulsive source and the source towed by the first marine survey vessel can be an impulsive source.

In accordance with at least one embodiment of the present disclosure, a geophysical data product may be produced or manufactured. Geophysical data may be obtained from a marine survey and stored on a non-transitory, tangible machine-readable medium. Obtaining the geophysical data can include towing, via a first marine survey vessel, a plurality of streamers at a first average speed and at an average velocity along a first survey route, maintaining a desired profile for each of the plurality of streamers via a respective drag control device coupled to each of the plurality of streamers along the first survey route, and towing, via a second marine survey vessel, a source at a second average speed that is greater than the first average speed along a second survey route that periodically passes over the first survey route and at the average velocity in a direction of the first survey route. The geophysical data product may be produced by processing the geophysical data offshore or onshore either within the United States or in another country. The geophysical data product can be recorded on a non-transitory machine-readable medium, thereby creating the geophysical data product. If the geophysical data product is produced offshore or in another country, it may be imported onshore to a facility in the United States. In some instances, once onshore in the United States, geophysical analysis may be performed on the geophysical data product. In some instances, geophysical analysis may be performed on the geophysical data product offshore.

Figure 15:
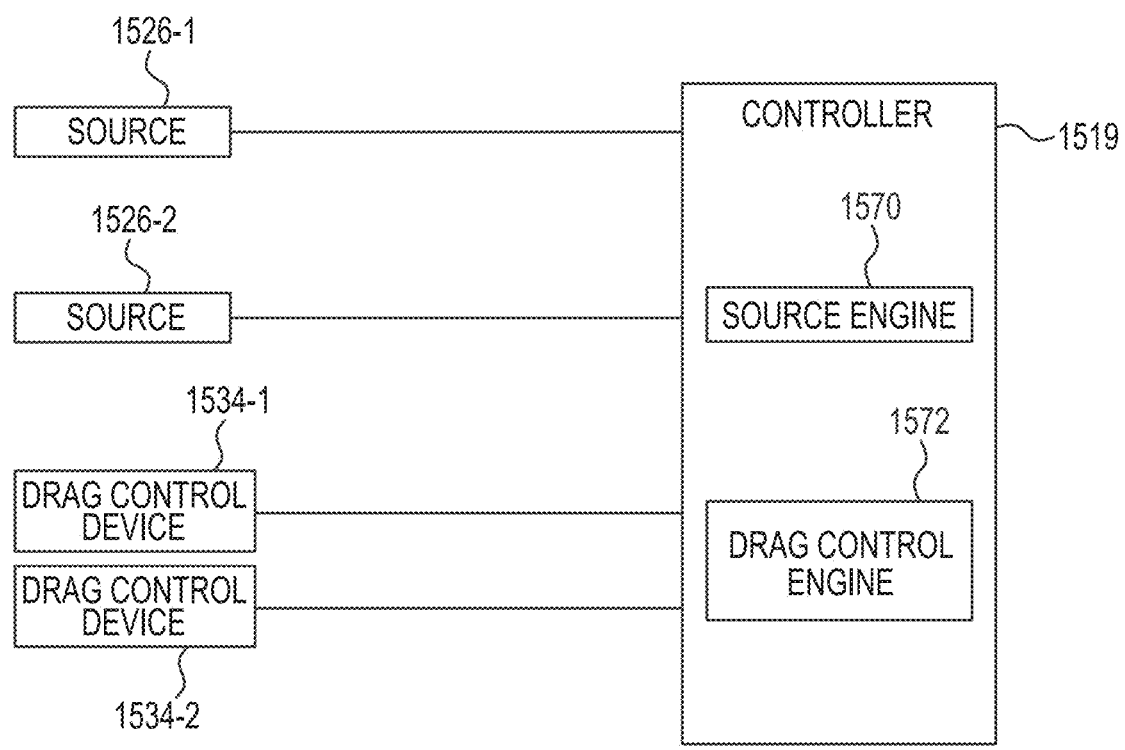
FIG. 15 illustrates an exemplary embodiment of a system for marine survey source route configuration.

FIG. 15 illustrates an exemplary embodiment of a system for marine survey source route configuration. The system can include a plurality of sources 1526-1, 1526-2 and a plurality of drag control devices 1534-1, 1534-2 configured to be coupled to a controller 1519. Although two sources 1526 and two drag control devices 1534 are illustrated, embodiments are not limited to a particular number of either. In at least one embodiment, the first source 1526-1 can be towed by a second marine survey vessel that does not tow streamers and the second source 1526-2 can be towed by a first marine survey vessel that also tows streamers. Although not specifically illustrated in FIG. 15, the drag control devices can be coupled to the streamers.

The controller 1519 can include a number of engines, such as a source operation engine ("source engine") 1570 and a drag control engine 1572. The controller 1519 can be analogous to the controller 119 illustrated in FIG. 1. The controller 1519, source engine 1570, and drag control device engine 1572 can be in communication with the sources 1526 and drag control devices 1534 via one or more communication links. In the embodiment illustrated in FIG. 15, the drag control devices 1534 are the active/powered type, as opposed to the passive type. The controller 1519 can include more or fewer engines than illustrated to perform the various functions described herein. The controller 1519 can represent program instructions and/or hardware of a machine, which can be part of one physical machine, such as a computer, or distributed between more than one physical machine, such as a wired or wireless network of computers. As used herein, an "engine" can include program instructions and/or hardware, but at least includes hardware. Hardware is a physical component of a machine that enables it to perform a function. Examples of hardware can include a processing resource, a memory resource, a logic gate, etc.

The number of engines can include a combination of hardware and program instructions that is configured to perform a number of functions described herein. The program instructions, such as software, firmware, etc., can be stored in a memory resource such as a machine-readable medium, etc., as well as hard-wired program such as logic. Hard-wired program instructions can be considered as both program instructions and hardware.

The controller 1519 can utilize software, hardware, firmware, and/or logic to perform a number of functions. The controller 1519 can be a combination of hardware and program instructions configured to perform a number of functions and/or actions. The hardware, for example, can include a number of processing resources and a number of memory resources, such as a machine-readable medium or other non-transitory memory resources. The memory resources can be internal and/or external to the controller 1519, for example, the controller 1519 can include internal memory resources and have access to external memory resources. The program instructions, such as machine-readable instructions, can include instructions stored on the machine-readable medium to implement a particular function. The set of machine-readable instructions can be executable by one or more of the processing resources. The memory resources can be coupled to the controller 1519 in a wired and/or wireless manner. For example, the memory resources can be an internal memory, a portable memory, a portable disk, and/or a memory associated with another resource, for example, enabling machine-readable instructions to be transferred and/or executed across a network such as the Internet. As used herein, a "module" can include program instructions and/or hardware, but at least includes program instructions.

The memory resources can be non-transitory and can include volatile and/or non-volatile memory. Volatile memory can include memory that depends upon power to store data, such as various types of dynamic random-access memory among others. Non-volatile memory can include memory that does not depend upon power to store data. Examples of non-volatile memory can include solid state media such as flash memory, electrically erasable programmable read-only memory, phase change random access memory, magnetic memory, optical memory, and/or a solid-state drive, etc., as well as other types of non-transitory machine-readable media.

The processing resources can be coupled to the memory resources via a communication path. The communication path can be local or remote to the controller 1519. Examples of a local communication path can include an electronic bus internal to a machine, where the memory resources are in communication with the processing resources via the electronic bus. Examples of such electronic buses can include Industry Standard Architecture, Peripheral Component Interconnect, Advanced Technology Attachment, Small Computer System Interface, Universal Serial Bus, among other types of electronic buses and variants thereof. The communication path can be such that the memory resources are remote from the processing resources, such as in a network connection between the memory resources and the processing resources. That is, the communication path can be a network connection. Examples of such a network connection can include a local area network, wide area network, personal area network, and the Internet, among others.

The controller 1519 can include a combination of hardware and program instructions, such as the source engine 1570, configured to actuate the first source 1526-1 and/or the second source 1526-2 while the marine survey vessels navigate along their respective paths. For those embodiments in which the first source 1526-1 and the second source 1526-2 are towed by different marine survey vessels, the controller 1519 can either be located on one of the marine survey vessels and communicate with the other source via a wireless connection, or the controller 1519 can be distributed between the two marine survey vessels.

The controller 1519 can include a combination of hardware and program instructions, such as the drag control engine 1572, configured to actuate any of the drag control devices 1534 to apply a tensile force to a streamer, to adjust a depth of a tail of a streamer, and/or to steer a tail of a streamer. Adjusting the tensile force applied to the streamer can help to maintain a straight-line profile of the streamer while it is being towed during a survey. The tensile force can be adjusted, for example, so that sufficient force is applied to keep the streamer straight, while not applying so much force that any damage to the streamer or its components is likely. Adjusting a depth of the tail of the streamer can be beneficial so that the streamer maintains a desired profile in the water. A depth of the head of the streamer (the end closest to the marine survey vessel towing the streamer) and a depth of the tail of the streamer may differ during towing because of currents, waves, or unequal buoyancy of various portions of the streamer, as some examples. Furthermore, the drag control devices can be used to maintain a fan shape for the spread of streamers. The fan shape can advantageously provide various coverages between negative and positive offsets. The ability to control the depth of the tail of the streamer allows operators to control the overall profile of the streamer during towing. Steering the tail of the streamer can help the marine survey vessel make tighter turns with less concern for tangling or other problems associated with towing long streamers during a turn.

Although not specifically illustrated, at least one embodiment can include a machine-readable medium for marine survey source route configuration. Machine-readable instructions can be stored in the machine-readable medium and segmented into a number of modules, that when executed by a processing resource can perform a number of functions. As used herein, a module includes a set of instructions included to perform a particular task or action. For example, the instructions can be segmented into modules analogous to the source engine 1570 and the drag control engine 1572 and be executed to perform function analogous to those described above with respect thereto.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for multi-azimuth acquisition, comprising:
   towing, via a first marine survey vessel, a streamer spread comprising a plurality of streamers along a first survey route; and
   towing, via a second marine survey vessel, a source along a second survey route;
   wherein the second survey route follows a non-straight-line path;
   wherein the non-straight-line path repeatedly crosses over at least a portion of the streamer spread such that, during each crossing, the source passes over a crossing point that has a fixed position relative to the streamer spread; and
   wherein relative positions of the source and the crossing point are maintained, in a crossline direction, such that the source remains at a same crossline position as the crossing point regardless of where the second marine survey vessel is located along the second survey route.

2. The method of claim 1, further comprising
   maintaining a desired profile for each of the plurality of streamers via a respective drag control device coupled to each of the plurality of streamers along the first survey route; and
   wherein the first marine survey vessel tows the plurality of streamers at a speed at which the plurality of streamers, but for the respective drag control devices, would not generate enough drag to maintain the desired profile.

3. The method of claim 1, further comprising passively maintaining a desired profile for each of the plurality of streamers via a respective drag control device coupled to each of the plurality of streamers.

4. The method of claim 1, further comprising actively maintaining a desired profile for each of the plurality of streamers via a respective drag control device coupled to each of the plurality of streamers.

5. The method of claim 1, further comprising controlling the second marine survey vessel via the first marine survey vessel.

6. The method of claim 1, wherein the second survey route comprises one of the group of survey routes including:
   a zigzag route;
   a racetrack route; and
   a sinusoidal route.

7. The method of claim 1, further comprising towing, via the first marine survey vessel, an additional source.

8. The method of claim 7, further comprising
   actuating the additional source along the first survey route; and
   actuating the source near-continuously along the second survey route.

9. The method of claim 1, wherein:
   the streamer spread has a head end and a tail end; and
   the crossing point is located substantially midway between the head end and the tail end in an inline direction and substantially midway between outermost ones of the plurality of streamers in the crossline direction.

10. The method of claim 1, wherein:
    the streamer spread has a head end and a tail end; and
    the crossing point is located substantially adjacent to the tail end in an inline direction and substantially midway between outermost ones of the plurality of streamers in the crossline direction.

11. The method of claim 1, wherein:
    the second survey route includes lateral extensions beyond an area defined by the streamer spread, on at least one side of the streamer spread in the crossline direction.

12. The method of claim 1:
    wherein the first marine survey vessel and the second marine survey vessel traverse a survey line of a survey during a first pass; and
    further comprising traversing the same survey line of the survey during a second pass, wherein the second survey route is different during the second pass than during the first pass.

13. The method of claim 1, further comprising:
    as the first marine survey vessel traverses the first survey route and the second marine survey vessel traverses the second survey route, recording, in a non-transitory computer readable medium, geophysical data obtained from sensors disposed in the plurality of streamers, and thereby manufacturing a geophysical data product.

14. A non-transitory computer readable medium having instructions stored thereon that, if executed by one or more processors aboard one or more marine survey vessels, cause the marine survey vessels to perform steps comprising:
    towing, via a first marine survey vessel, a streamer spread comprising a plurality of streamers along a first survey route; and
    towing, via a second marine survey vessel, a source along a second survey route;
    wherein the second survey route follows a non-straight-line path;
    wherein the non-straight-line path repeatedly crosses over at least a portion of the streamer spread such that, during each crossing, the source passes over a crossing point that has a fixed position relative to the streamer spread; and
    wherein relative positions of the source and the crossing point are maintained, in a crossline direction, such that the source remains at a same crossline position as the crossing point regardless of where the second marine survey vessel is located along the second survey route.

15. The medium of claim 14, wherein:
    the streamer spread has a head end and a tail end; and
    the crossing point is located substantially midway between the head end and the tail end in an inline direction and substantially midway between outermost ones of the plurality of streamers in the crossline direction.

16. The medium of claim 14, wherein:

the streamer spread has a head end and a tail end; and the crossing point is located substantially adjacent to the tail end in an inline direction and substantially midway between outermost ones of the plurality of streamers in the crossline direction.

17. The medium of claim 14, wherein:

the second survey route includes lateral extensions beyond an area defined by the streamer spread, on at least one side of the streamer spread in the crossline direction.

18. The medium of claim 14:

wherein the first marine survey vessel and the second marine survey vessel traverse a survey line of a survey during a first pass; and further comprising traversing the same survey line of the survey during a second pass, wherein the second survey route is different during the second pass than during the first pass.

* * * * *